US006542269B1

United States Patent
Martinelli et al.

(10) Patent No.: US 6,542,269 B1
(45) Date of Patent: Apr. 1, 2003

(54) OPTICAL DEVICE FOR PROCESSING AN OPTICAL IMPULSE

(75) Inventors: Mario Martinelli, San Donato Milanese (IT); Guido Alberto Maier, Segrate (IT); Lorenzo Ghioni, Casalmaiocco (IT); Achille Pattavina, Milan (IT)

(73) Assignee: Corning O.T.I., Inc., Dover, DE (US)

( * ) Notice: Subject to any disclaimer, the term of this patent is extended or adjusted under 35 U.S.C. 154(b) by 0 days.

(21) Appl. No.: 09/397,640

(22) Filed: Sep. 16, 1999

Related U.S. Application Data
(60) Provisional application No. 60/101,096, filed on Sep. 18, 1998.

(30) Foreign Application Priority Data

Sep. 17, 1998 (EP) .............................................. 98203131

(51) Int. Cl.[7] .................................................. H04J 14/08
(52) U.S. Cl. ........................ 359/140; 359/123; 359/189
(58) Field of Search ................................ 359/140, 123, 359/189, 135, 139

(56) References Cited

U.S. PATENT DOCUMENTS 3,838,278 A * 9/1974 Duguay et al. ........ 250/227.12
4,442,550 A * 4/1984 Killat .......................... 359/189
4,809,256 A * 2/1989 Smith et al. ................ 359/140
4,856,092 A   8/1989 Wade
5,493,434 A * 2/1996 Sasayama et al. .......... 359/123
5,619,360 A * 4/1997 Marshall et al. ............ 359/140
5,930,018 A * 7/1999 Effenberger ................ 359/158
6,330,089 B1 * 12/2001 Yamada ...................... 359/115

FOREIGN PATENT DOCUMENTS

EP            0 851 205 A2    7/1998

* cited by examiner

Primary Examiner—John Tweel
(74) Attorney, Agent, or Firm—Ronald J. Paglierani (57) ABSTRACT

An optical device comprises an input for an input optical impulse and an optical beam splitting element for supplying, from the input optical impulse, a first pair and a second pair of optical impulses. Also included is a first optical delay element to delay, by a predetermined time, at least one of the first pair of optical impulses and a second optical delay element to delay, by a predetermined time, at least one of the second pair of optical impulses. A first optical processing element supplies a first output optical signal to a first output when commanded by the first pair of optical impulses and a second optical processing element supplies a second output optical signal to a second output when commanded by the second pair of optical impulses.

12 Claims, 11 Drawing Sheets

OPTICAL DEVICE FOR PROCESSING AN OPTICAL IMPULSE

CROSS-REFERENCE TO RELATED APPLICATIONS

This application is based on European Patent Application No. 98203131.2 filed on Sep. 17, 1998 and U.S. Provisional Application No. 60/101,096 filed on Sep. 18, 1998, the content of which is incorporated hereinto by reference.

BACKGROUND OF THE INVENTION

1. Field of the Invention

The present invention relates to an optical device for generating, from an input optical impulse, a first and a second output optical impulse, each having a preselected temporal phase shift with respect to the input optical impulse and a preselected duration.

2. Technical Background

At the present time, in telecommunications networks, optical technology is predominantly used for the transmission of optical signals, in which use is made of the known wideband properties of optical fibres, while the operations of processing the optical signals, such as multiplexing and switching, are carried out by means of opto-electronic devices.

However, opto-electronic devices have the known disadvantages of electronic circuits which are becoming bottlenecks in optical communications systems and in optical networks. This is because electronic devices have a narrow bandwidth compared with the optical band available in optical communications systems, and are generally based on a relatively slow serial processing of the signals.

Research is therefore being increasingly directed towards the possibility of using optics not only for the transmission of signals but also for their processing. This is due to the fact that, potentially, wholly optical devices have a wide bandwidth and are transparent to the bit rate, the format and the code of the transmission.

The inventors of the present invention have noted the necessity of an optical device which, on receiving an optical impulse at its input, is capable of supplying two optical impulses at the output, for example two optical control impulses, each having a preselected temporal phase shift with respect to the input optical impulse and also having a preselected duration.

SUMMARY OF THE INVENTION

A first aspect of the present invention is therefore an optical device comprising:
an input for an input optical impulse;
an optical beam splitting element for supplying, from the said input optical impulse, a first pair of optical impulses and a second pair of optical impulses;
at least a first optical delay element to delay, by a predetermined time, at least one of the said optical impulses of the said first pair;
at least a second optical delay element to delay, by a predetermined time, at least one of the said optical impulses of the said second pair;
a first optical processing element capable of supplying a first output optical signal when commanded by the said first pair of optical impulses;
a second optical processing element capable of supplying a second output optical signal when commanded by the said second pair of optical impulses;
a first output connected to the said first optical processing element for the said first output optical signal;
a second output connected to the said second optical processing element for the said second output optical signal.

Typically, the said first output optical signal has a duration which is modified with respect to at least one of the said optical impulses.

Generally, the said second output optical signal has a duration which is modified with respect to at least one of the said optical impulses.

Preferably, the said optical beam-splitting element comprises a first optical beam splitter, to form a first and a second optical impulse from the said input optical impulse, and a second and a third optical beam splitter to form the said first pair of optical impulses and the said second pair of optical impulses from the said first optical impulse and from the said second optical impulse, respectively.

More preferably, the said optical device also comprises at least a third optical delay element to delay, by a predetermined time, at least one of the said first and second optical impulses.

Typically, the said first optical processing element consists of an optical flip-flop. Preferably, the said second optical processing element also consists of an optical flip-flop.

A second aspect of the present invention is therefore a method for supplying, from an input optical impulse, a first and a second output optical impulse, each having a preselected time delay with respect to the input optical impulse, and also having a preselected duration, the said method comprising the steps of
a) supplying the said input optical impulse;
b) supplying a first pair of optical impulses and a second pair of optical impulses from the said input optical impulse;
c) imparting a predetermined delay to at least one of the said optical impulses of the said first pair;
d) imparting a predetermined delay to at least one of the said optical impulses of the said second pair;
e) supplying the said first output optical impulse as a function of the said optical impulses of the said first pair;
f) supplying the said second output optical impulse as a function of the said optical impulses of the said second pair.

Preferably, one of the said optical impulses of the said first pair is delayed by a predetermined time with respect to the other.

Advantageously, one of the said optical impulses of the said second pair is delayed by a predetermined time with respect to the other.

According to one embodiment, step e) consists in supplying an output optical signal at the command of one of the two optical impulses of the said first pair and interrupting the transmission of the said output optical signal at the command of the other of the two optical impulses of the said first pair, in such a way as to supply the said first output optical impulse.

According to another embodiment, step f) consists in supplying an output optical signal at the command of one of the two optical impulses of the said second pair and interrupting the transmission of the said output optical signal at the command of the other of the two optical impulses of the said second pair, in such a way as to supply the said second output optical impulse.

Preferably, the said first output optical impulse has a duration which is modified with respect to the said input optical impulse.

Even more preferably, the said first output optical impulse is time-delayed with respect to the said input optical impulse.

Preferably, the said second output optical impulse has a duration which is modified with respect to the said input optical impulse..

Even more preferably, the said second output optical impulse is time-delayed with respect to the said input optical impulse.

BRIEF DESCRIPTION OF THE DRAWINGS

Characteristics and advantages of the invention will now be explained with reference to embodiments shown by way of example and without restriction in the attached figures, in which.

DETAILED DESCRIPTION OF THE PREFERRED EMBODIMENTS

Figure 2:
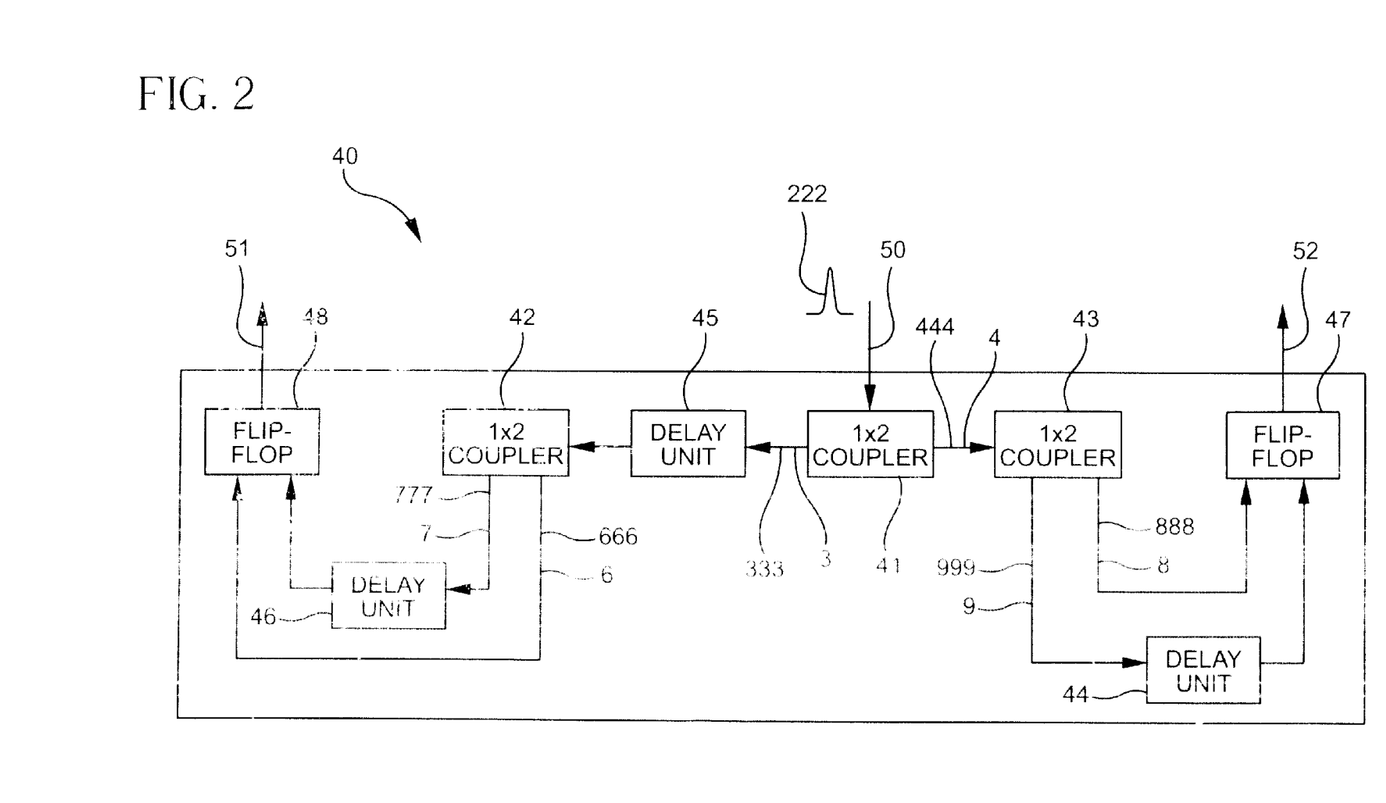
FIG. 2 is a schematic representation of an optical device according to the invention.

According to the embodiment shown in FIG. 2, the optical device 40 according to the invention comprises a first 1×2 coupler 41, a second 1×2 coupler 42 and a third 1×2 coupler 43, a first delay unit 44, a second delay unit 45 and a third delay unit 46, a first flip-flop 47 and a second flip-flop 48, and suitable optical connections 3, 4, 6, 7, 8, 9. The input of the first coupler 41 forms the input 50 of the optical device 40, the output of the flip-flop 48 forms its first output 51 and the output of the flip-flop 47 forms its second output 52. The connections 3, 4, 6, 7, 8, 9 preferably consist of optical fibres or waveguides.

The couplers 41–43 are conventional couplers. Preferably, they are 1×2 directional 50/50 (3 dB) couplers.

The delay units 44, 45 and 46 may either be of the constant delay type (the time interval between the moment at which the signal appears at the input and that at which the same signal begins to be available at the output is substantially fixed and not modifiable) or of the variable delay type (the time interval between the moment at which the signal appears at the input and that at which the same signal begins to be available at the output is modifiable).

For example, in the illustrated embodiment, the delay units 44 and 45 are of the constant delay type, while the unit 46 is of the variable delay type.

The constant delay units 44 and 45 are made, for example, from a section of optical fibre having a length L=v*T, where T is the delay to be obtained and v (v=c/n) is the velocity c of light inside an optical fibre having a refractive index n.

Figure 4:
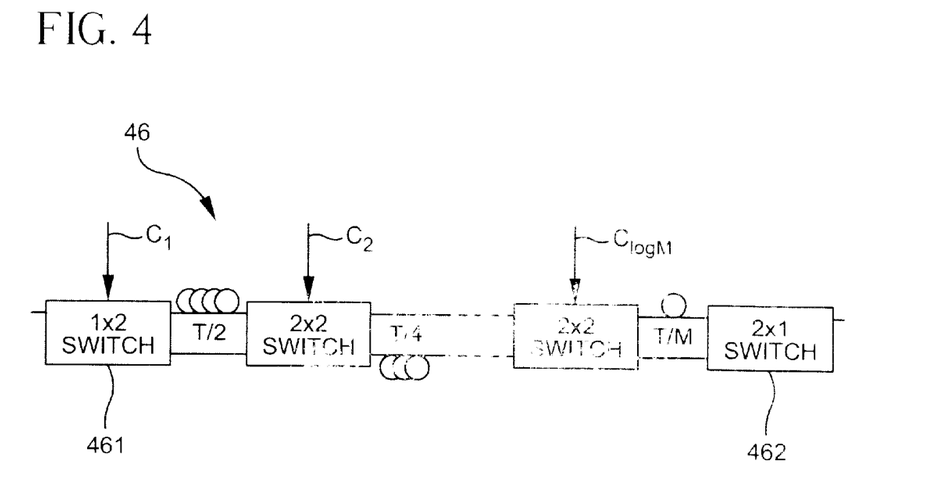
FIG. 4 is a schematic representation of a first embodiment of a variable delay unit of the optical device shown in FIG. 2.

According to the embodiment shown in FIG. 4, the variable delay unit 46 consists of an input 1×2 switch 461, an output 2×1 switch 462 and a certain number of 2×2 switches, disposed in series between the two input and output switches 461 and 462. The input switch 461 has one input and two outputs connected, respectively, to a predetermined optical fibre delay line and to a section of optical fibre of negligible length (which introduces a negligible delay in an optical signal passing through it). The i-th switch has two inputs, one for a predetermined optical fibre delay line and the other for a section of fibre of negligible length, and two outputs connected to a further predetermined delay line and to a further section of fibre of negligible length. Finally, the output switch 462 has two inputs, for a predetermine delay line and a section of fibre of negligible length respectively, and one output.

In order to enable M different delays to be provided, the unit 46 preferably consists of a number, equal to $\log_2 M$, of switches connected in series, including the input switch 461, in addition to the output switch 462. Additionally, the predetermined optical fibre delay line connected to the output of the i-th switch preferably has a length such that it causes a delay equal to $T/2^i$ ($1 \leq i \leq \log_2 M$) in the signal in transit.

The switches in series are controlled by suitable control signals $c_1-c_{log2M}$ which determine the path of the signal in transit along the delay lines and/or along the sections of fibre of negligible length and, consequently, the delay applied to this signal in transit. This is because the signal arriving at one of the two inputs of the switch is sent to one output rather than to another, according to the presence or absence of the control signal.

Typically, a switch is a device provided with at least one input, at least two outputs for a signal in transit and at least one input for at least one control signal. In the absence of the control signal, the input signal leaves the device through one of the said outputs, whereas in the presence of the control signal the signal is diverted to another of the said outputs.

Figure 8:
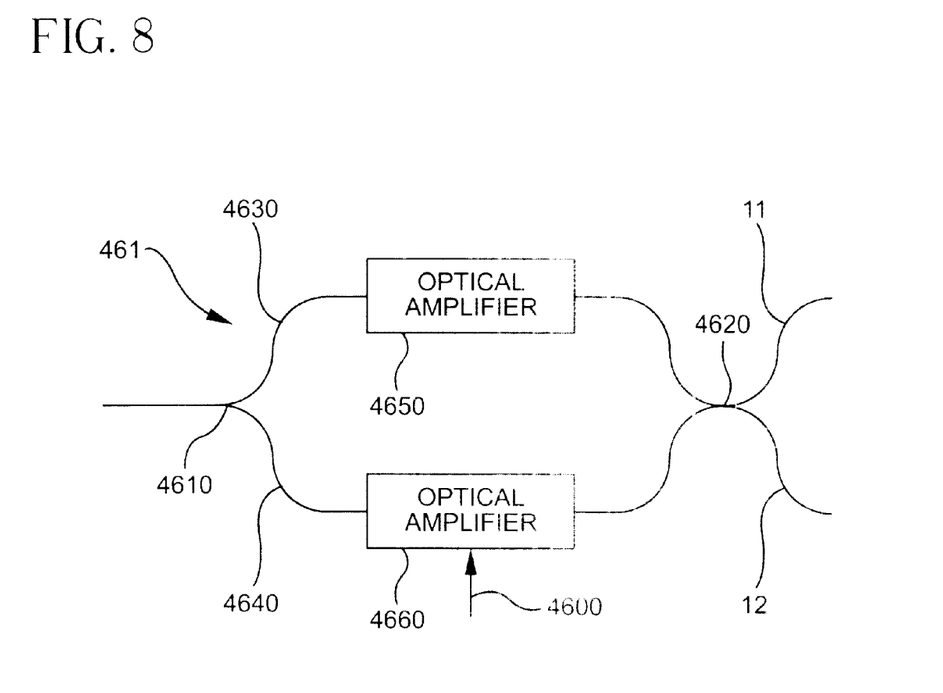
FIG. 8 is a schematic representation of an optical switch included in the variable delay unit of FIG. 4.
Figure 9A:
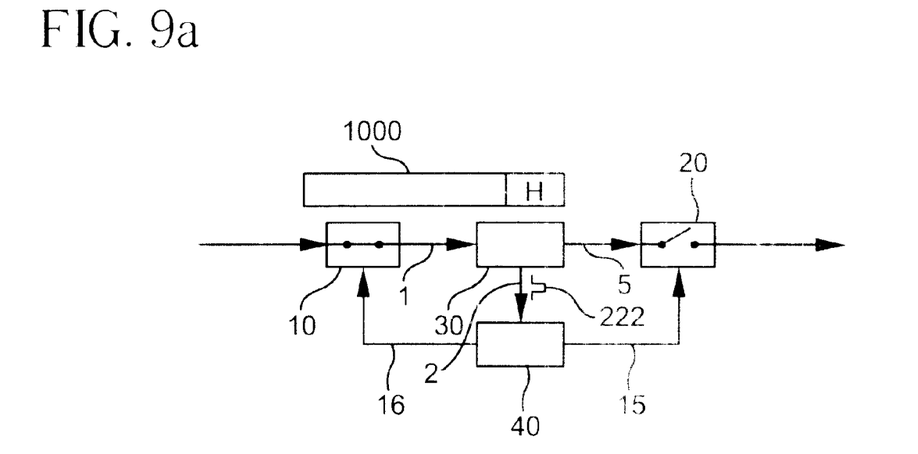
FIGS. 9(a) through 9(d) are schematic representations of the operation of the optical selector shown in FIG. 1.
Figure 9B:
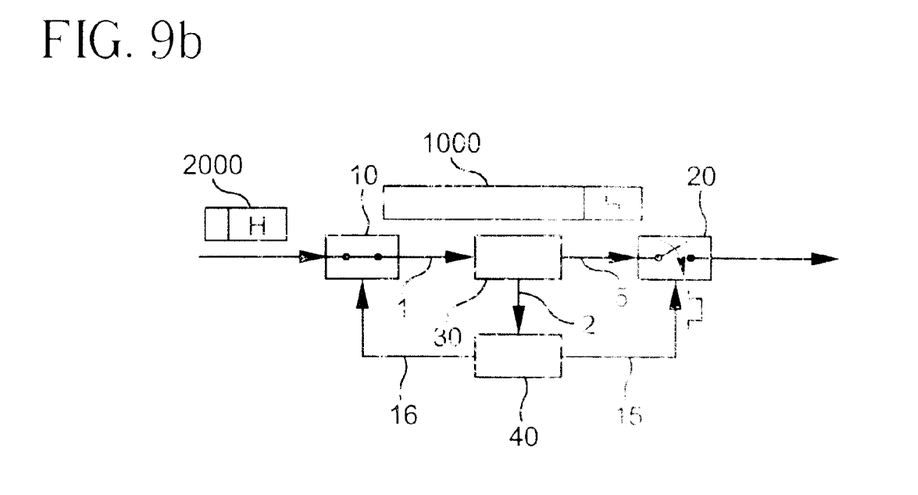
Figure 9C:
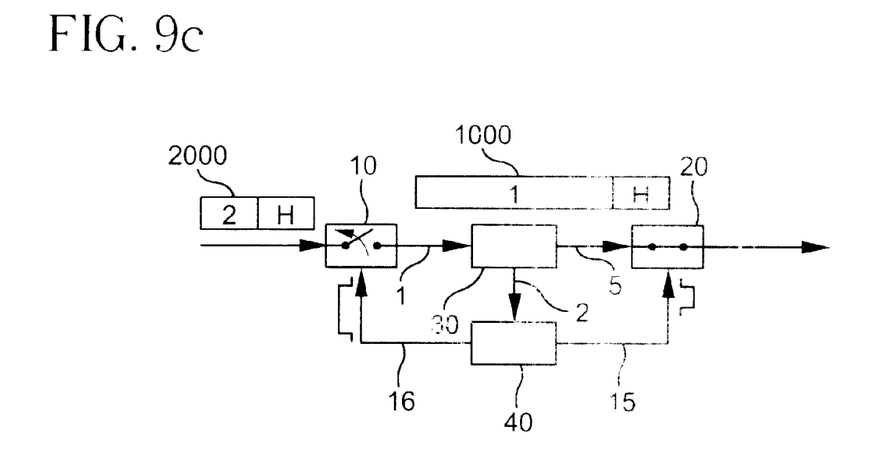
Figure 9D:
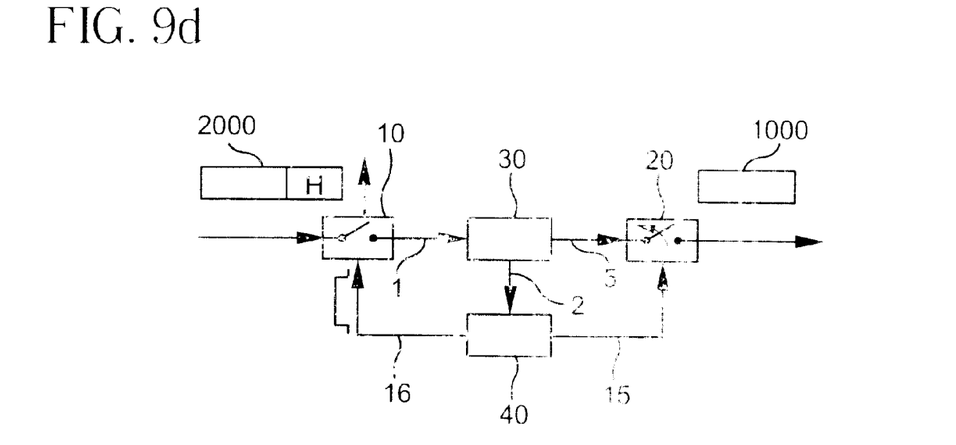

The said switch may consist of a device having a conventional interferometric structure of the Mach-Zehnder type. FIG. 8 shows, for example, the 1×2 input switch 461. This comprises an input coupler 4610, an output coupler 4620, two guided optical paths 4630 and 4640, a coupler 4670 (not shown) for an optical control signal 4600 and two outputs 11 and 12. In turn, each of the two guided optical paths 4630 and 4640, preferably consisting of optical fibres or waveguides, comprises a conventional optical amplifier 4650 and 4660, respectively. The said optical amplifiers 4650 and 4660 are, for example, of the type consisting of optical fibres doped with rare earths or of the semiconductor type, and their gain is regulated in such a way that the optical signals arriving from the two guided optical paths 4630 and 4640 have the same strength at the input of the said output coupler 4620.

The couplers 4610, 4620 and 4670 are conventional couplers. Preferably, they are directional 50/50 couplers consisting of optical fibres or waveguides (3 dB).

According to one embodiment, the amplifiers 4650 and 4660 are conventional optical semiconductor amplifiers consisting of active InGaAsP waveguides surrounded by a shell of InP. By regulating the supply current of the said optical semiconductor amplifiers or by illuminating the active waveguide with a predetermined optical control signal, it is possible to vary the density of the charge carriers inside the said active waveguide and, consequently, its refractive index. For the construction of the switch 461, the supply current of the said optical amplifiers 4650 and 4660 is regulated in such a way as to impart a predetermined phase shift between the optical signals which are propagated in the optical paths 4630, 4640 and which are then added in a coherent way in the output coupler 4620. For example, the said supply current is regulated in such a way that the signals propagated in the two optical paths 4630 and 4640 interfere constructively in the output 11 and destructively in the output 12. Conversely, the strength and the wavelength of the optical control signal 4600 are selected in such a way as to make the signals propagated in the two optical paths 4630 and 4640 interfere constructively in the output 12 and destructively in the output 11. In this way, in the absence of an optical control signal 4600 (normal operating conditions), an optical signal at the input of the switch is diverted towards the output 11 while, in the presence of the optical control signal 4600, it is diverted towards the output 12.

Alternatively, the control signal 4600 may be electrical.

Figure 5A:
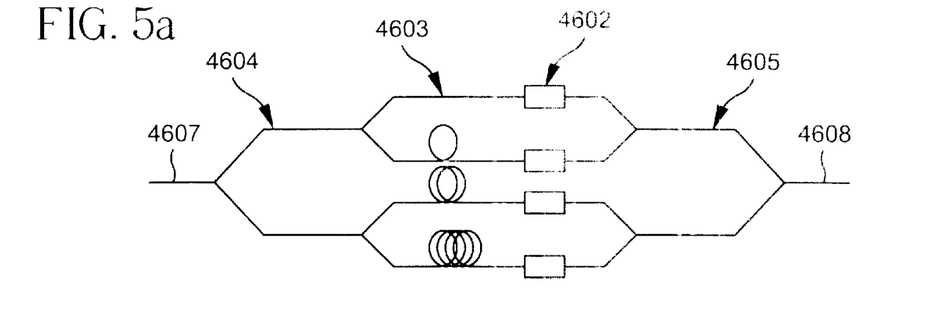
FIG. 5 is a schematic representation of four variants (FIGS. 5a–5d) of a second embodiment of a variable delay unit of the optical device shown in FIG. 2.
Figure 5B:
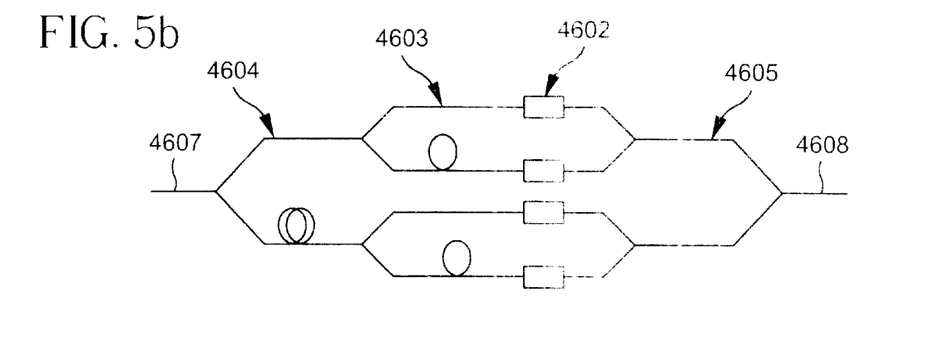
Figure 5C:
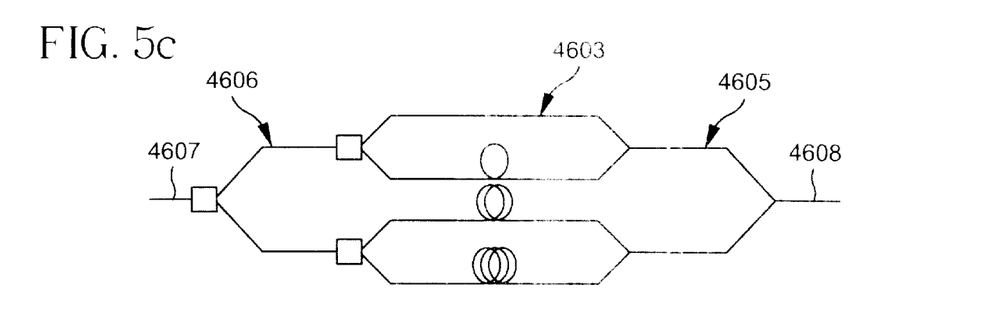
Figure 5D:
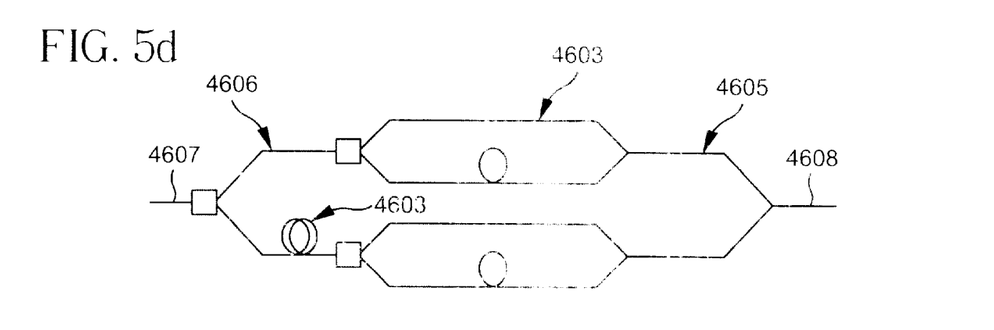

According to a second embodiment, the variable delay unit 46 consists of a conventional tree structure such as that shown in FIGS. 5a–5d. This structure comprises an input 4607, a plurality of sections of optical fibre (indicated as a whole by the number 4603 in FIG. 5), each having a predetermined length, and an output 4608. In FIGS. 5a and 5b, conventional beam splitters (for example, 1×2 directional couplers in series, indicated as a whole by the number 4604 in FIGS. 5a and 5b) repeatedly divide an input optical signal and transmit it in the various sections of optical fibre 4603. The outputs of these latter sections of optical fibre 4603 are then coupled by suitable couplers (for example, 2×1 couplers in series, indicated as a whole by the number 4605 in FIG. 5) to return to a single optical fibre at the output 4608. Optical gates (indicated as a whole by the number 4602 in FIGS. 5a and 5b) are present at the outputs of the various sections of optical fibre 4603, only the gate corresponding to the signal delayed by the desired quantity being open (allowing the signal to pass), while the others are closed (blocking the passage of the signal). Alternatively, as shown in FIGS. 5c and 5d, in place of the said beam splitters 4604 it is possible to connect 1×2 switches (indicated as a whole by the number 460G in FIGS. 5c and 5d) which direct the input signal as required, according to the delay which is to be imparted to it, into different sections of optical fibre 4603. The said switches 4606 may be, for example, of the type described previously and shown in FIG. 8.

Figure 3:
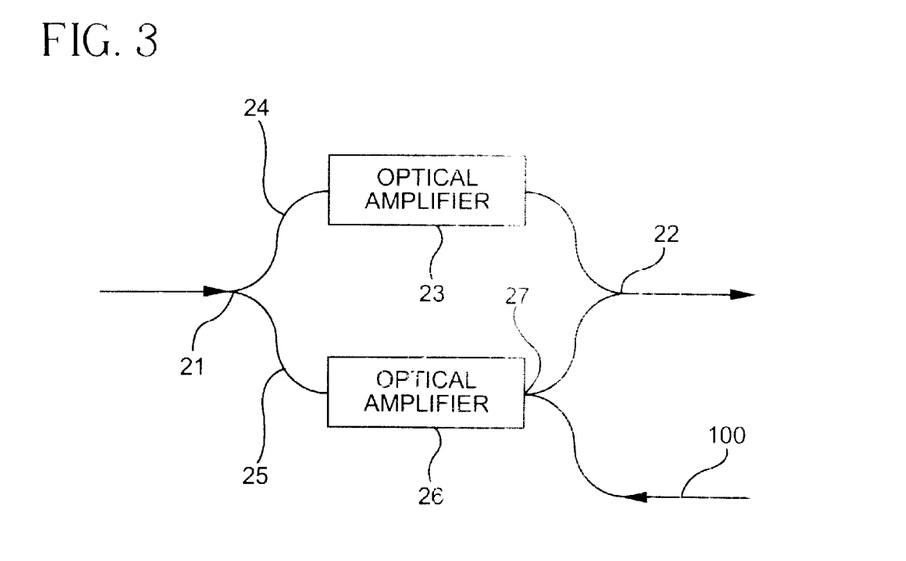
FIG. 3 is a schematic representation of one embodiment of an optical gate of the optical selector shown in FIG. 1.

In turn, the said optical gates 4602 consist, for example, of a conventional interferometer of the Mach-Zender type as shown in FIG. 3.

Typically, an optical gate is a device provided with an input and an output for an optical signal in transit and with at least one input for at least one control signal capable of varying the normal state of the said gate. More particularly, the said at least one control signal closes a gate which is normally open, or vice versa.

According to the embodiment shown in FIG. 3, each gate comprises a 1×2 input coupler 21, a 2×1 output coupler 22, a first optical propagation path 24 and a second optical propagation path 25 and a first optical amplifier 23 and a second optical amplifier 26. The said optical amplifiers 23 and 26 are conventional optical amplifiers, for example of the optical fibre type doped with rare earths or of the semiconductor type. In the embodiment shown, they are of the semi-conductor type. Typically, the said couplers 21 and 22 are conventional 50/50 directional couplers (3 dB) consisting of optical fibres or waveguides. The input coupler 21 divides an input optical signal into two signals of approximately the same strength which travel along the two paths 24 and 25 of the interferometer. Each of the optical paths 24 and 25 preferably consists of an optical fibre or of a waveguide. The first optical semiconductor amplifier 23 is connected in the first path 24, while the second optical semiconductor amplifier 26 is connected in the second path 25. Each of the semiconductor amplifiers 23 and 26 consists, for example, of an active InGaAsP waveguide surrounded by a shell of InP, and their supply current is regulated, as stated previously, in such a way as to impart a predetermined phase shift between the optical signals propagated in the optical paths 24 and 25. When the said signals are phase shifted with respect to each other by 180° ($\pi$), they interfere destructively in the output coupler 22 and the gates are closed (blocking the passage of the optical signal), whereas when they are shifted by 0° or 360° ($2\pi$), they interfere constructively and the gates are open (allowing the optical signal to pass). Additionally, by means of an optical control signal 100 having suitable strength and wavelength it is possible to obtain, in a way similar to that demonstrated for the switches, a further phase shift between the optical signals in the two optical paths 24 and 25 and thus to change the state of the gates from closed to open or from open to closed. The optical control signal 100 is supplied to one of the two amplifiers (to the amplifier 26 in the case of FIG. 3) by means of a third 2×1 conventional coupler 27 consisting of optical fibre or a waveguide. Alternatively, the optical control signal 100 is supplied by means of a conventional optical circulator. Additionally, the gain of the said optical semiconductor amplifiers 23 and 26 is regulated in such a way that the optical signals from the two guided optical paths 24 and 25 have the same strength at the input of the said output coupler 22.

According to one embodiment, an optical filter (not shown) is connected at the output of the coupler 22 to filter the ASE (Amplified Spontaneous Emission) generated by the optical amplifiers 23 and 26 and to reduce the quantity of noise transmitted to the following stages. The said optical filter may be of the interference type such as a conventional reference filter, a Mach-Zehnder filter, an interference grating or a diffraction grating.

Alternatively, the said gates may be made by connecting a single optical semiconductor amplifier directly into the optical path of the input signal. Given the connection losses due both to the reflections of the signal at the input and output of the amplifier and to the material of which the amplifier consists, a gate will be open when the gain of the amplifier is greater than the connection losses, in other words when the supply current is greater than a predetermined threshold value. Conversely, the gate will be closed when the gain of the amplifier is less than the connection losses, in other words when the supply current is below the said threshold value. According to another variant, the gate may be closed by means of an optical control signal having a wavelength and strength such that the optical amplifier is saturated and thus preventing a further optical signal at the input of the amplifier from being transmitted to its output.

Figure 6:
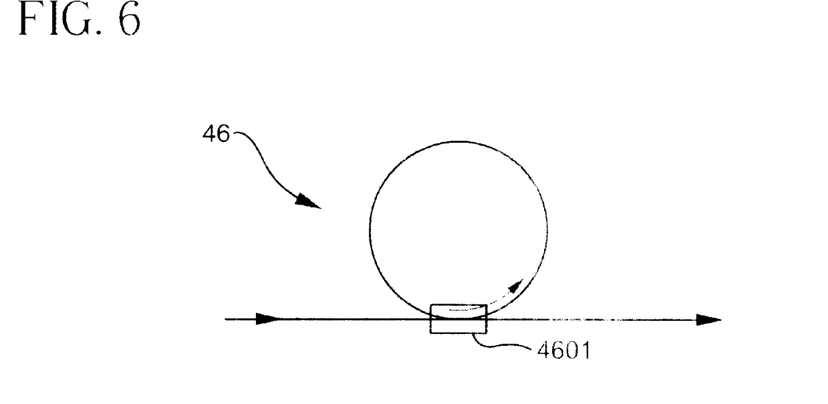
FIG. 6 is a schematic representation of a third embodiment of a variable delay unit of the optical device shown in FIG. 2.

According to a third embodiment, the variable delay unit 46 has a structure of the loop type, as shown in FIG. 6. In this type of structure, the input optical signal is delayed by making it circulate for a predetermined number of times in an optical fibre loop having a predetermined length according to the delay which is to be obtained. The signal is then collected at the output by means of a 2×2 switch 4601 (of the type shown in FIG. 8, for example) which has the function of inserting the signal into the said optical fibre loop and of extracting it at the output of the loop.

Typically, the optical flip-flops 47 and 48 are two-state devices which remain in one state or the other until a signal causing the transition from one state to the other is applied to them. For example, they may be conventional optical devices of the Set-Reset (SR) type with two inputs and one output, in which an optical set impulse at one of the two inputs sets the state of the output to 1 (emission of an output optical signal) and an optical reset impulse at the other input sets the state of the output to 0 (absence of an output optical signal). The output of the device remains in the state 1 until an optical reset impulse causing the transition from the state 1 to the state 0 is applied to one of the two inputs. In turn, the output remains in the state 0 until an optical set impulse causing the transition from the state 0 to the state 1 is applied to the other of the two inputs.

Figure 7:
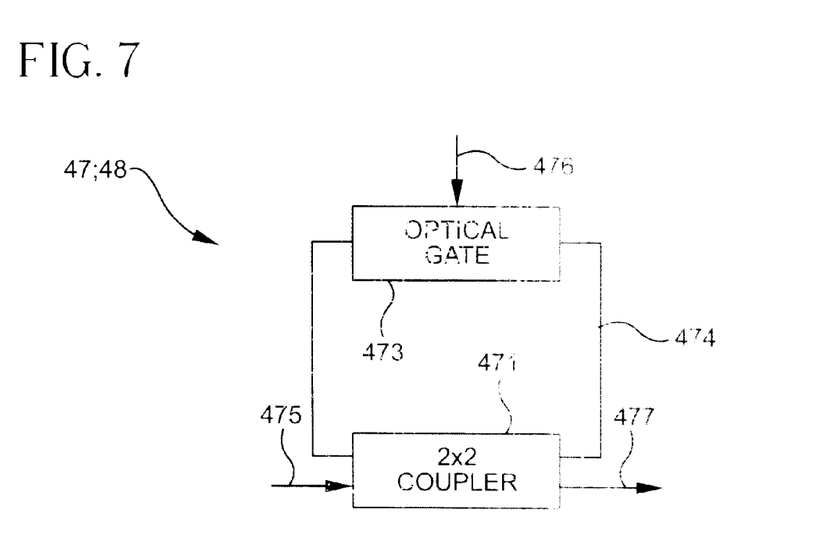
FIG. 7 is a schematic representation of a first embodiment of an optical flip-flop of the optical device shown in FIG. 2.

For example, according to the embodiment shown in FIG. 7, each of the optical flip-flops 47 and 48 consists of a loop-type optical fibre structure 474 in which a conventional 2×2 coupler 471 and an optical gate 473 are connected. The coupler 471 is preferably of the 50/50 directional type and the optical gate 473 is, for example, one of the types described previously. Additionally, each flip-flop has a first set input 475 for an input optical impulse (set), a second reset input 476 for an optical control impulse (reset) and an output 477. Following an optical set impulse at the input 475 and in the absence of the optical reset impulse, an output optical signal having substantially constant strength is transmitted to the output 477 of the flip-flop. Conversely, in the presence of the optical reset impulse, no optical signal is transmitted to the output 477 of the flip-flop.

The coupler 471 subdivides the optical set impulse into two impulses having substantially the same strength and transmits one of them into the loop structure 474 and the other to the output 477. In the absence of the optical reset impulse, the optical gate 473 is open and allows the optical set impulse to pass in the loop structure 474 to the coupler 471. Every time the optical set impulse transmitted into the loop structure 474 returns to the coupler 471, half of its strength is again transmitted to the output and the other half into the loop structure 474. Preferably, the total length of the optical fibre loop structure 474 is selected in such a way that the optical set impulse which is made to circulate in it is subsequently transmitted to the output, at the tail of the preceding optical impulse transmitted to the output. In other words, the propagation time in the loop structure 474 is preferably equal to the duration of the optical set impulse. In this way, an optical signal having a duration equal to a multiple of the duration of the set impulse is transmitted to the output 477 of the flip-flop. Additionally, the gain of the optical semiconductor amplifiers of the gate 473 is preferably selected in such a way as to compensate for the losses undergone by the optical set impulse during its propagation in the loop structure 474 and thus to ensure that the said output optical signal has a constant strength.

In the presence of the optical reset impulse the optical gate 473 closes and thus interrupts the propagation of the said optical set impulse in the loop structure 474. Preferably, the optical reset impulse has a duration equal to that of the optical set impulse. In this way, the optical gate 473 remains closed for a sufficiently long time to extinguish the optical set impulse in the loop structure 474. Consequently, while the optical reset impulse is absent, the optical set impulse is continually retransmitted to the output, in such a way that an optical signal of virtually constant strength is present at the output of the flip-flop. Following the arrival of the optical reset impulse, however, the transmission of the said optical signal to the output 477 of the flip-flop is blocked. At the output of the flip-flop, therefore, there is an output optical impulse which is temporally aligned with the arrival of the optical set impulse and has a duration equal to the difference between the time of arrival of the optical reset impulse and the preceding time of arrival of the optical set impulse.

According to one embodiment, an optical filter (not shown) is connected in the loop structure 474 to filter the ASE (Amplified Spontaneous Emission) generated by the optical amplifiers present in the optical gate 473 and to reduce the quantity of noise accumulated along the said loop structure 474. The said optical filter may be of the interference type such as a conventional reference filter, a Mach-Zehnder filter, an interference grating or a diffraction grating.

According to another embodiment, the optical flip-flops 47 and 48 may be of the type described in patent application EP 97122771 in the name of the present applicant. For example, as shown in FIG. 10, they may be formed in free space where the light beams are propagated in a vacuum or in the atmosphere between optical elements such as filters, prisms and mirrors.

Figure 10:
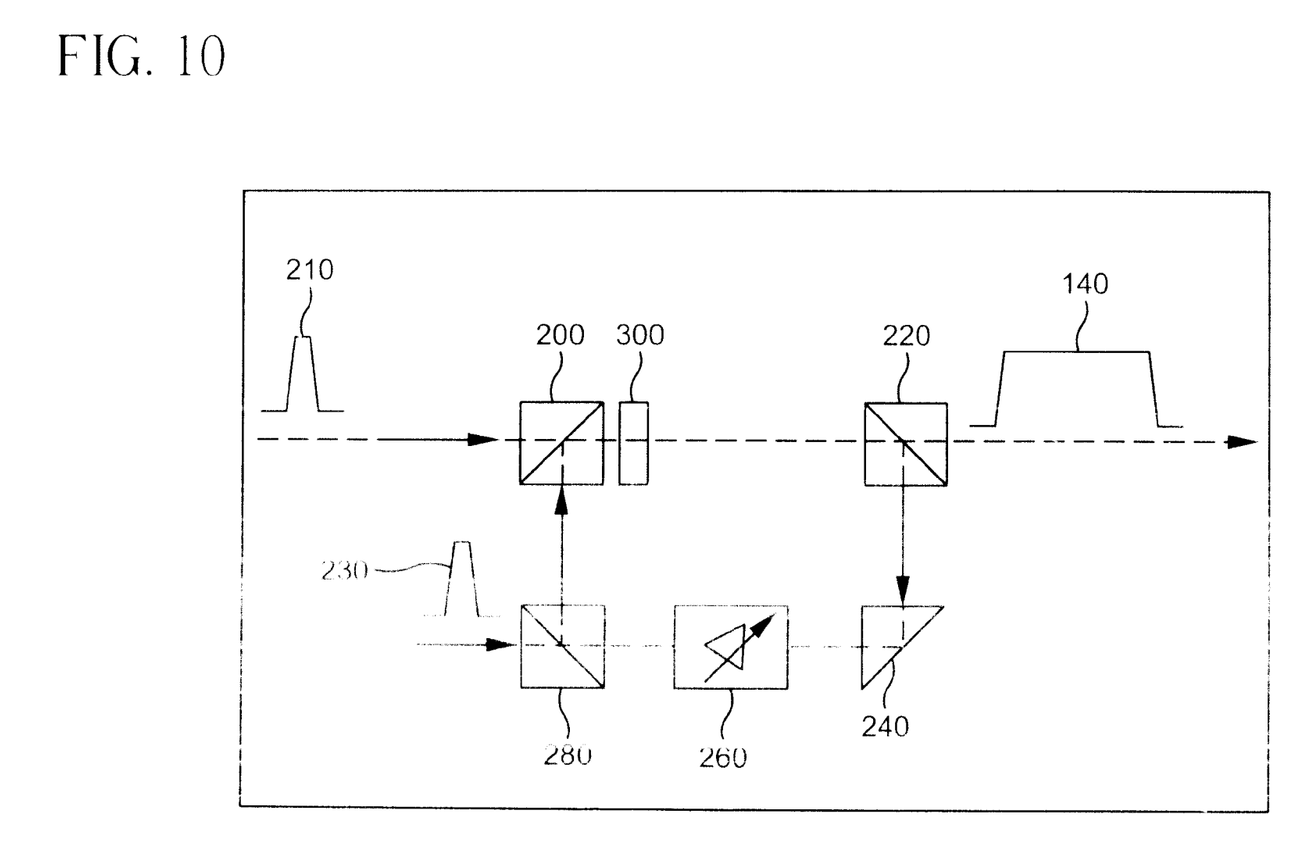
FIG. 10 is a schematic representation of a second embodiment of an optical flip-flop of the optical device shown in FIG. 2.

According to the embodiment in FIG. 10, a flip-flop comprises a first optical beam splitter 200 having a first input for an optical set impulse 210, a second input and an output, a second optical beam splitter 220 having an input coupled optically to the output of the first optical beam splitter 200 and two outputs, a third optical beam splitter 280 having a first input coupled optically to an output of the second optical beam splitter 220 and a first output coupled optically to the second input of the first optical beam splitter 200 in such a way as to form a loop. The said optical beam splitter 280 also comprises a second input for an optical reset impulse 230 and a second output coupled optically to an optical amplifier 260 included in the said loop. The said optical beam splitters are, for example, conventional partially reflecting mirrors or conventional prisms. A reflecting element 240, such as a prism, a mirror or the like, optically couples the optical amplifier 260 to an output of the optical beam splitter 220. The said optical amplifier 260 is a conventional optical amplifier, for example of the fibre type doped with rare earths or of the semiconductor type.

Preferably, an optical filter 300 is connected in the loop 22 to filter the ASE (Amplified Spontaneous Emission) generated by the optical amplifier 260 and to reduce the quantity of noise accumulated along the loop. The said optical filter 300, as stated previously, may be of the interference type such as a conventional reference filter, a Mach-Zehnder filter, an interference grating or a diffraction grating.

The operation of this embodiment of the flip-flop is entirely analogous to that of the preceding one. An optical set impulse 210 input into the first optical beam splitter 200 enters the loop. The second beam splitter 220 divides the said optical set impulse into an optical signal 140 which leaves the loop and into an optical feedback signal which is transmitted to the optical amplifier 260. The optical feedback signal is amplified by the optical amplifier 260 and then retransmitted to the optical beam splitter 220 after two reflections by the optical beam splitters 280 and 200. The optical beam splitter 220 divides the optical feedback signal into a first portion, which maintains the output optical signal 140 even after the termination of the optical set impulse 210, and a second portion which is again transmitted along the loop. The output optical signal 140 is then interrupted by an optical reset impulse 230 which saturates the optical amplifier 260 and thus blocks the propagation of the optical feedback signal along the loop.

Preferably, in this case also the gain of the optical amplifier is such that it compensates for the losses undergone by the optical feedback signal in the loop and the propagation time along the loop is equal to the duration of the set impulse 210.

In one embodiment, the wavelength of the optical reset impulse 230 is different from that of the optical set impulse 210. The filter 300 can thus be selected in such a way as to allow the wavelength of the optical set impulse 210 to pass and to stop that of the optical reset impulse 230, preventing the optical reset impulse 230 from being transmitted to the output.

Figure 11:
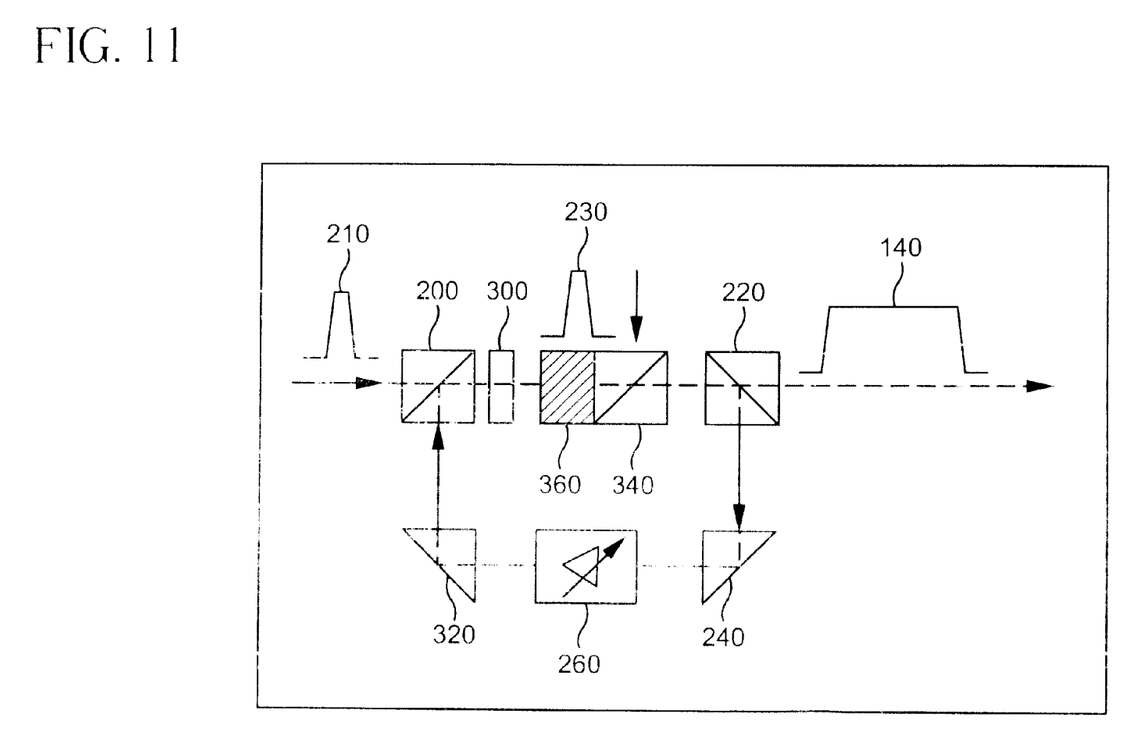
FIG. 11 is a schematic representation of a third embodiment of an optical flip-flop of the optical device shown in FIG. 2.

According to a further embodiment shown in FIG. 11, the loop shown in FIG. 10 also comprises an optical gate 360, an optical beam splitter 340 for supplying the optical reset impulse 230 to the optical gate 360 and a reflecting element 320 in place of the optical beam splitter 280. The optical gate is, for example, of the same type as those described previously. The operating principle of this embodiment is entirely analogous to that of the preceding embodiment.

With reference to an example of operation of the optical device 40, an optical impulse 222 at the input of the coupler 41 is divided into two optical impulses 444 and 333 of approximately equal strength. The optical impulse 333 is transmitted along the connection 3 towards the constant delay unit 45 which delays it by a length of time equal to a predetermined time interval $T_C$. The optical impulse 333, delayed by the unit 45, is then divided into two further optical impulses 666 and 777 by the coupler 42. The first impulse 666 is transmitted to the set input of the flip-flop 48 through the connection 6, while the second impulse 777 is transmitted to the variable delay (T) unit 46 and then, through the connection 7, to the reset input of the said flip-flop 48. In this way, with a delay $T_C$ in the arrival of the control impulse 222 at the input of the optical device 40, the optical impulse 666 (the set impulse) causes the emission of an optical signal, at substantially constant strength, from the output of the flip-flop 48. Then, after a delay T with respect to $T_C$, the optical impulse 777 (the reset impulse) blocks the transmission of the said optical signal to the output of the flip-flop 48.

In turn, the optical impulse 444 is transmitted along the connection 4 to the coupler 43, which produces an optical impulse 888 which, through the connection 8, arrives at the set input of the flip-flop 47, and an optical impulse 99 which, through the connection 9, arrives at the reset input of the said flip-flop 47. The said optical impulses 888 and 999 are temporally phase-shifted with respect to each other by a time $T_C$ by the constant delay unit 44. In this way the optical impulse 888 (the set impulse), with a negligible delay with respect to the arrival of the said optical control impulse 222 at the input of the optical device 40, causes the emission of an optical signal, of a substantially constant strength, from the output of the flip-flop 47. Additionally, the optical impulse 999 (the reset impulse), with a delay $T_C$ after the arrival of the said control impulse 222, blocks the transmission of the said optical signal to the output of the flip-flop 47.

Consequently, according to the illustrated embodiment, the optical device 40 generates, as a result of the optical control impulse 222 at the input, two optical impulses, of which the one at the output 52 has a duration of $T_C$ and is aligned temporally with the arrival of the optical control impulse 222 at the input; and the one at the output 51 has a duration of T and is delayed, with respect to the arrival of the optical control impulse 222 at the input, by a time equal to $T_C$.

Therefore, if the delay units are selected in a suitable way, the optical device 40 according to the invention, when it has received an optical impulse at its input, generates two optical impulses at the output, each having a desired delay with respect to the arrival of the input optical impulse, and also having a desired duration. For example, in the absence of the delay unit 45, both of the output optical impulses can be aligned temporally with respect to the arrival of the input optical impulse and can have, depending on the way in which the delay units 44 and 46 are selected, durations which are equal to or different from each other and equal to or different from the input optical impulse. Conversely, in the presence of a delay unit for both of the optical impulses 333 and 444, both of the output optical impulses can be temporally phase-shifted with respect to the arrival of the input optical impulse, and can have, depending on the way in which the delay units 44 and 46 are selected, durations which are equal to or different from each other and equal to or different from the input optical impulse.

The optical device 40 according to the invention may be used, for example, to control the opening and closing times of the input and output of an optical selector to control the frequency of arrival (f) of cells in optical networks using asynchronous transfer mode (ATM).

ATM is a transmission method consisting in grouping the data transmitted from various sources in packets of digital data (cells) which consist of a payload of 43 bytes and a header of 5 bytes. The header comprises various fields containing data used by the nodes of the ATM network to control the switching of the ATM cells. This transmission method also includes a negotiation of the cell transmission frequency (PCR) before the opening of a connection between a source and an ATM network or between two different ATM networks.

The PCR check is a very important operation in optical ATM networks. It must be carried out both at the point at which the traffic sources have access to an ATM network and at points of interconnection between different ATM networks, and consists in checking that each source or network does not generate cells at a frequency (f) greater than that negotiated, in other words greater than the frequency (PCR) which has been assigned to it by the network to which it is connected.

Figure 1:
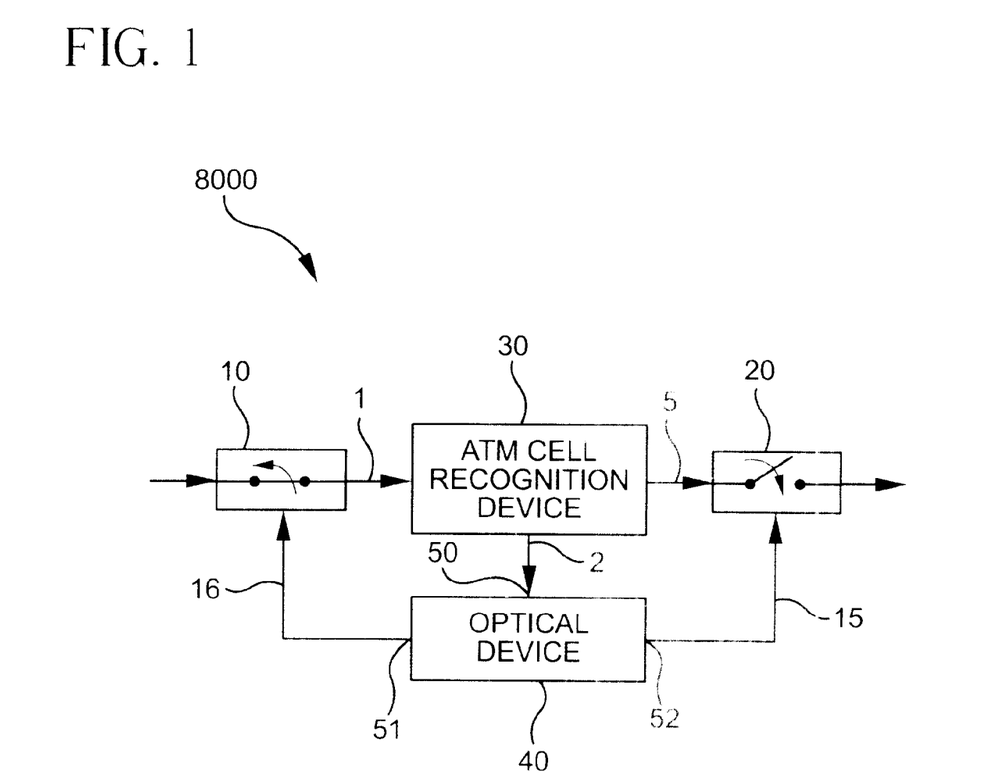
FIG. 1 is a schematic representation of a form of application of the optical device according to the invention in an optical selector.

FIG. 1 shows an optical selector 8000 which acts as a PCR checker in ATM networks, using an optical device according to the present invention. The said optical selector 8000 can permit the passage of only those ATM cells which appear at its input with a frequency f (cells per second) less than or equal to a predetermined frequency PCR (f≦PCR).

As shown in FIG. 1, the optical selector 8000 comprises an input optical gate 10, an output optical gate 20, an ATM cell recognition device 30 and an optical device 40, according to the invention, connected in a loop structure consisting of 5 optical connections 1, 2, 5, 15 and 16.

Preferably the said optical connections 1, 2, 5, 15 and 16 consist of conventional optical fibres or waveguides.

The input optical gate 10 and the output optical gate 20 are, for example, of the type shown in FIG. 3. In normal operating conditions (in the absence of a control signal), the input gate 10 is in an open state, while the output gate 20 is in a closed state. The optical impulse from the output 51 of the optical device 40 forms the control signal for the input optical gate 10, while the optical impulse from the output 52 of the optical device 40 forms the control signal for the output optical gate 20. Consequently, in the presence of an optical impulse arriving, through the optical fibre connection 16, from the flip-flop 48, the input optical gate 10 changes its state from open to closed and maintains it until the said optical impulse is present (for a time equal to T). In turn, in the presence of an optical impulse arriving, through the optical fibre connection 15, from the flip-flop 47, the output optical gate 20 changes its state from closed to open and maintains it while the said optical impulse is present (for a time equal to $T_C$).

According to a preferred embodiment, the cell recognition device 30 is a wholly optical device capable of recognizing the header of an ATM cell at its input. The said device permits the passage of the cells of bits arriving at its input from the optical fibre connection 1 to the optical fibre connection 5 and, when it recognizes that the header of an ATM cell is present at its input, sends an optical control impulse 222 for the optical device 40 along the optical fibre connection 2. For example, European patent application No. 97201988.9 filed by the present applicant describes a wholly optical device (not shown) which generates an optical impulse at the output when it recognizes a predetermined sequence of bits (the header of an ATM cell) at its input. The said device comprises

- a series/parallel converter for converting a series (cell) of N bits into a corresponding spatial pattern of N bits carrying the same information;
- optical means for generating, from the said spatial pattern of N bits, a first two-dimensional image consisting of N rows and M columns;
- optical means for carrying out a logical AND operation between the elements of the said first two-dimensional image and those of a predetermined second two-dimensional image having N rows and M columns, and for generating in this way a third two-dimensional image having N rows and M columns;
- means for carrying out a logical XOR operation between the elements of each column of the said third two-dimensional image, and for generating in this way a second parallel pattern of M bits;
- means for carrying out a logical OR operation between the bits of the said second parallel pattern of M bits, and for generating in this way the said output optical impulse.

FIGS. 9(*a*)–9(*d*) represent schematically the operation of the optical selector 8000 shown in FIG. 1. An ATM cell 1000, characterized by a predetermined frequency f of arrival (cells per second), is transmitted from the input gate 10, which is normally in the open state, to the cell recognition device 30, through the connection 1. The cell recognition device 30 permits the passage of the cell 1000 along the connection 5 towards the output gate 20 and, when it recognizes that the header of an ATM cell is present at its input, generates a first optical impulse 222, temporally aligned with the header of the cell 1000, and transmits it to the optical device 40 through the connection 2 [FIG. 9(*a*)]. At this point, 1) with a negligible delay with respect to the generation of the optical impulse 222,
   the optical device 40 generates a first optical signal at the output 52 which, through the connection 15, arrives at the output gate 20. The said first optical signal changes the state of the output gate 20 from closed to open and thus permits the passage of the cell 1000 out of the output of the optical selector 8000 [FIG. 9(*b*)];
2) with a delay $T_C$, equal to the duration of the cell 1000, with respect to the generation of the optical impulse 222, the optical device 40
   generates a second optical signal at the output 51 which, through the connection 16, arrives at the input gate 10. The said second optical signal changes the state of the input gate 10 from open to closed and thus prevents other arriving cells from entering the optical selector 8000 [FIG. 8(*c*)]; and
   again causes the output gate 20 to close (interrupts the emission of the said first optical signal) [FIG. 9(*d*)] to prevent other bits which may have entered the selector 8000 and which do not belong to the cell 1000 from leaving it;
3) with a further delay T [$T=(1/PCR)-T_C$] with respect to $T_C$, the optical device 40 again causes the input gate 10 to open (interrupts the emission of the said second optical signal) to permit the passage of other ATM cells which arrive in the selector 8000 with a delay greater than or equal to TPCR with respect to the cell 1000.

In this way, if a second cell 2000 arrives in the optical selector 8000 before a time interval $T_{PCR}=T_C+T=1/PCR$ has elapsed after the arrival of the first cell 1000, the input gate 10, being still in the closed state, prevents it from entering the optical selector 8000 [FIG. 9(*d*)]. Additionally, even if, when the input gate 10 changes its state from closed to open, part of the second cell 2000 is still at the input of the gate 10, the said remaining part of the cell 2000 is not recognized by the cell recognition device 30 and, therefore, the optical impulse 222 is not transmitted to the optical device 40. Consequently the latter does not cause the output gate 20 to open and does not permit the said remaining part of the cell 2000 to pass to the output of the optical selector 8000. In this way, incomplete cells of bits at the input of the optical selector 8000 cannot pass to its output.

To summarize,
- a first arriving cell 1000 can, in normal conditions, enter the optical selector 8000 through the gate 10 and reach the cell recognition device 30;
- the cell recognition device 30 transmits the optical impulse 222 along the connection 2 when it recognizes the header of the cell 1000;
- the state of the output gate 20 changes from closed to open immediately after the arrival of the optical impulse 222;
- the state of the input gate 10 changes from open to closed after a time $T_C$ (after the whole of the cell 1000 has passed through the gate 10);
- the output gate 20 remains open for a time interval equal to $T_C$ (after the whole of the cell 1000 has passed through the gate 20);
- the input gate 10 remains closed for a time interval equal to T (to prevent new cells arriving at the input of the optical selector 8000 with f>PCR from entering the device).

This is because, with respect to the arrival of the optical impulse 222 at the input 50 of the optical device 40:
- the set impulse 888 is not delayed;
- the reset impulse 999 is delayed by a fixed delay equal to the duration $T_C$ of the cell 1000;
- the set impulse 666 is delayed by a fixed delay equal to the duration $T_C$ of the cell 1000;
- the reset impulse 777 is delayed by a total delay equal to 1/PCR, and, with respect to the set impulse 666, by a delay equal to T.

The variable delay unit 46 enables the value of T to be changed according to the PCR negotiated between a source and an ATM network [T=(1/PCR)−$T_C$].

The device 40 according to the invention, by supplying two output optical impulses, temporally phase-shifted with respect to each other by a time equal to $T_C$ and having durations of $T_C$ and T, therefore enables the open and closed times of the input optical gate 10 and the output optical gate 20 of the optical selector 8000 to be controlled and thus enables a wholly optical controller to be provided for ATM networks.

What is claimed is:

1. An optical device comprising:

an input for an input optical impulse;

an optical beam splitting element for supplying, from the said input optical impulse, a first pair of optical impulses and a second pair of optical impulses;

at least a first optical delay element to delay, by a predetermined time, at least one of the said optical impulses of the said first pair;

at least a second optical delay element to delay, by a predetermined time, at least one of the said optical impulses of the said second pair;

a first optical processing element capable of supplying a first output optical signal when commanded by the said first pair of optical impulses;

a second optical processing element capable of supplying a second output optical signal when commanded by the said second pair of optical impulses;

a first output connected to the said first optical processing element for the said first output optical signal;

a second output connected to the said second optical processing element for the said second output optical signal.

2. An optical device according to claim 1, characterized in that the said first output optical signal has a duration which is modified with respect to at least one of the said optical impulses.

3. An optical device according to claim 1, characterized in that the said second output optical signal has a duration which is modified with respect to at least one of the said optical impulses.

4. An optical device according to claim 1, characterized in that the said optical beam splitting element comprises a first optical beam splitter, to form a first and a second optical impulse from the said input optical impulse, and a second and a third optical beam splitter to form the said first pair of optical impulses and the said second pair of optical impulses from the said first optical impulse and from the said second optical impulse.

5. An optical device according to claim 4, characterized in that it also comprises at least a third optical delay element to delay, by a predetermined time, at least one of the said first and second optical impulses.

6. An optical device according to claim 1, characterized in that the said first optical processing element consists of an optical flip-flop.

7. An optical device according to claim 1, characterized in that the said second optical processing element consists of an optical flip-flop.

8. A method for supplying, from an input optical impulse, a first and a second output optical impulse, each having a preselected time delay with respect to the input optical impulse, and also having a preselected duration, the said method comprising the steps of a) supplying the said input optical impulse;

b) supplying a first pair of optical impulses and a second pair of optical impulses from the said input optical impulse;

c) imparting a predetermined delay to at least one of the said optical impulses of the said first pair;

d) imparting a predetermined delay to at least one of the said optical impulses of the said second pair;

e) supplying the said first output optical impulse as a function of the said optical impulses of the said first pair;

f) supplying the said second output optical impulse as a function of the said optical impulses of the said second pair.

9. A method according to claim 8, characterized in that the said first output optical impulse has a duration which is modified with respect to the said input optical impulse.

10. A method according to claim 8, characterized in that the said first output optical impulse is time-delayed with respect to the said input optical impulse.

11. A method according to claim 8, characterized in that the said second output optical impulse has a duration which is modified with respect to the said input optical impulse.

12. A method according to claim 11, characterized in that the said second output optical impulse is time-delayed with respect to the said input optical impulse.

* * * * *

UNITED STATES PATENT AND TRADEMARK OFFICE
CERTIFICATE OF CORRECTION

PATENT NO.     : 6,542,269 B1                                              Page 1 of 1
DATED          : April 1, 2003
INVENTOR(S)    : Achelle Pattavina et al.

It is certified that error appears in the above-identified patent and that said Letters Patent is hereby corrected as shown below:

<u>Column 14,</u>
Line 38, should read -- A method according to claim 9, characterized in that..., --

Signed and Sealed this

Twenty-third Day of December, 2003

JAMES E. ROGAN
*Director of the United States Patent and Trademark Office*